United States Patent [19]

Nozawa

[11] 4,277,001

[45] Jul. 7, 1981

[54] INVERTIBLE MINIATURE ATOMIZER OF MANUAL TYPE

[75] Inventor: Takamitsu Nozawa, Tokyo, Japan

[73] Assignee: Yoshino Kogyosho Co., Ltd., Tokyo, Japan

[21] Appl. No.: 941,619

[22] Filed: Sep. 12, 1978

Related U.S. Application Data

[63] Continuation-in-part of Ser. No. 707,006, Jul. 20, 1976, abandoned.

[30] Foreign Application Priority Data

Jul. 21, 1975 [JP] Japan ........................... 50-100965[U]

[51] Int. Cl.$^3$ ........................ B05B 9/043; G01F 11/36

[52] U.S. Cl. .................................... 222/321; 222/376; 222/385; 222/402.19; 239/333; 239/342

[58] Field of Search ............... 239/321, 329, 331, 333, 239/334, 342; 222/320, 321, 332, 341, 376, 380, 381–385, 387, 397, 402.19, 402.2, 464, 478, 482; 417/503; 137/855

[56] References Cited

U.S. PATENT DOCUMENTS

| | | | |
|---|---|---|---|
| 1,484,920 | 2/1924 | Wolfe | 239/334 X |
| 1,544,600 | 7/1925 | Sammis | 222/376 |
| 1,568,084 | 1/1926 | Pearsons | 222/376 X |
| 2,867,213 | 1/1959 | Thomas, Jr. | 137/855 X |
| 3,239,151 | 3/1966 | Boris | 239/333 |
| 3,908,870 | 9/1975 | Nozawa et al. | 222/385 X |
| 3,955,901 | 5/1976 | Hamilton | 137/855 X |
| 4,017,031 | 4/1977 | Kishi et al. | 239/333 |

FOREIGN PATENT DOCUMENTS

| | | | |
|---|---|---|---|
| 648460 | 1/1951 | United Kingdom | 239/333 |

*Primary Examiner*—Andres Kashnikow
*Attorney, Agent, or Firm*—Edwin E. Greigg

[57] ABSTRACT

A miniature type, invertible atomizing spray mechanism includes a receptacle for liquid to be atomized, and further includes at least one pressure chamber, which depends within the receptacle and is arranged to have received therein a piston with which a reciprocable spray head is arranged to cooperate. Beneath the pressure chamber is disposed a valve member which is adapted to control the suction of the liquid into the pressure chamber. The valve member opens an inlet of the pressure chamber by the reciprocal movement of the spray head. The inlet of the pressure chamber is in fluid communication with a passage leading to a three-way valve. The three-way valve includes upper and lower valving assembly which communicate with a passage extending to the cylinder of the atomizer, each of the valving assembly being in communication with the bottom of the receptacle as well as an area adjacent to the neck portion of the atomizer through elongated tubular elements.

8 Claims, 6 Drawing Figures

INVERTIBLE MINIATURE ATOMIZER OF MANUAL TYPE

CROSS-REFERENCE TO RELATED DISCLOSURES

This application is a continuation-in-part of our co-pending application Ser. No. 707,006 filed July 20, 1976 entitled "Invertible Miniature Atomizer of Manual Type", now abandoned.

BACKGROUND OF THE INVENTION

This invention relates to a manual-type miniature atomizer and more particularly to a manual-type miniature atomizer usable in both a normal upright position as well as in an inverted position for atomizing the desired unit volume of perfume, cosmetic preparations and the like by one depressing operation of the spray head.

Various proposals have been made for miniature atomizers of the manual type. For example, in one proposal described in U.S. Pat. No. 3,399,836, a single cylinder is formed midway of a liquid passage extending from a liquid container to a nozzle outlet in an atomizer head. In operation, when the atomizer head is depressed, a piston formed at the lower end of a bored stem which depends from the atomizer head, is removed downward within a cylinder. As a result, the liquid, which has been confined in the cylinder, is permitted to pass through the bore of the stem and then to spurt from the nozzle outlet. At this instant, the liquid thus discharged will be mixed with ambient air and atomized into desired fine mist. When the atomizer head is set free after the depressing operation, the piston is moved upward together with the head by the action of a built-in coil spring so that a vacuum is established in the cylinder. The vacuum will open a check valve beneath the cylinder to admit the liquid from the container into the cylinder. However, this type of atomizer can only be used in an upright or slightly inclined position and will not function at all in an inverted position since there is no way for the liquid to reach the area adjacent to the check valve.

OBJECT AND SUMMARY OF THE INVENTION

It is, therefore, the primary object of the present invention to provide a miniature atomizer that can be usable in both normally vertical and inverted positions in order to preclude the above drawback.

A more specific object of the present invention is to provide means by which an atomizer may be modified without any change of the atomizing means to provide a device which can atomize the liquid in any position of the container.

It is also another object of the present invention to provide a modified miniature atomizer at a low production cost by the use of a three-way valve of simple structure.

Another important object of the present invention is to expand an applicable range of use of an atomizer to a great extent.

These and other objects and advantages of the present invention will become apparent from the following description taken in conjunction with the accompanying drawings.

DESCRIPTION OF THE PREFERRED EMBODIMENTS

Figure 1:
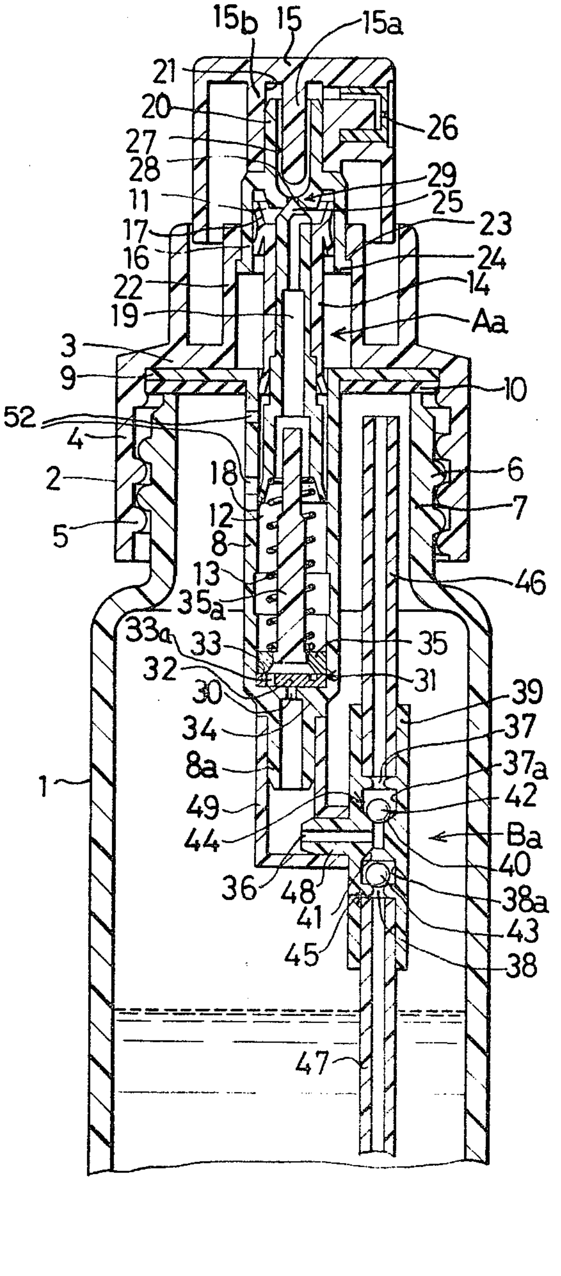
FIG. 1 is a longitudinal cross-section of an invertible miniature atomizer of manual type, showing the first embodiment of the present invention.

The first embodiment of the present invention will be described with reference to FIG. 1, in which an atomizing device indicated at Aa, depends within a liquid container 1 from a suspending member or a cap 2. The cap 2 is formed substantially medially of its extent with a step portion 3 from which depends an internally threaded sleeve 4, provided with threads which is attachable to an externally threaded portion 6 formed on neck 7 of the liquid container 1, thereby enabling one to refill the container 1 whenever necessary. It will be noted that the atomizing device is slidably arranged within the cylinder 8, the upper portion of which is provided with an annular flange 9 between the lower surface of which and the top lip of the bottle 1 is interposed a seal 10. The atomizing device is substantially encompassed by a tubular member 14 provided at opposite ends with pistons 17 and 18, respectively, and provides for communication between an upper chamber 11 and a lower chamber 12 formed in the cylinder 8.

The cylinder 8 is formed at the bottom thereof with an integral shoulder 32 perforated as at 30 and terminating in a nipple 8*a*, said nipple being arranged to receive an L-shaped tubular piece 49 the purpose of which will be described later herein.

The upper piston 17 cooperates with the upper cylinder 16 which in turn is associated with reciprocable atomization head 15.

The shoulder 32 formed with the lower cylinder provides a seat 33 for a valve member 31 said valve member having means defining an opening therein at 33*a* that is offset to one side of said valve member and thus does not provide aligned orientation with the perforation 30 in the lower cylinder, but permits passage of liquid from the container 1 to the lower cylinder 8 upon reciprocation of the atomized head 15. Of interest reference to background material thereto will be understood by referring to and by now incorporating by reference the text of the Nozawa and Kishi U.S. Pat. No. 3,908,870 issued Sept. 30, 1975, and the co-pending application of Kishi et al., Ser. No. 616,884 filed Sept. 25, 1975, now U.S. Pat. No. 4,017,031 issued in the United States on Apr. 18, 1977 and assigned to Yoshino Kogyosho Company, Limited.

It will be clear from the drawings that said pistons 17 and 18 have spaced upper and lower skirt means. In cylinder 8, there are provided vertically spaced vent means 52. The upper and lower skirt means of piston 18 are adapted to open and close said vent means.

The upper piston 17 cooperates with a cylinder 16 which is integral at its upper end with a sleeve 20 having a smaller diameter arranged to be received in the atomizing head 15 as shown. The sleeve 20 is inserted into a cylindrical bore 21 of the element **15*b* and the upper cylinder 16 is fitted to the atomizing head 15 to provide a unitary structure. The upstanding cylindrical portion 22 of the cap 2 is formed on the inner periphery of its upper end with an inward flange 23 while the upper cylinder 16 is formed on the outer periphery of its lower end with an outward flange 24. With these flanges 23, 24 interlocked, the upper cylinder 16 is prevented from slipping out of the cap 2**.

The sleeve 20 includes a port 28 which cooperates with a conical valve member 25 formed on the center of the upper end of the tubular sliding member 14. The cavity 27 provides for communication of the upper pressure chamber 11 with the nozzle outlet 26 of the atomizing head 15.

Moreover, the lower valve 31 used in the present invention is not restricted only to the above type of the check valve, but also includes such a well-known check valve structure as comprises a valve seat formed on the upper end of a suction port and a ball valve member disposed thereon.

As referred to earlier herein, a three-way valve assembly indicated generally by the letters Ba, is in fluid communication with the atomizing device Aa through the suction port 30 of the cylinder 8. The three-way valve Ba includes an integral T-shaped valve casing 39 within which there are disposed three restrictor type valve passages 36, 37, 38 all of which have fluid communication with each other. The valve casing 39 of the three-way valve Ba is manufactured with synthetic resinous material to provide a unitary structure. Two of the three valve passages, such as, the valve passages 37, 38 are symmetrically disposed opposite each other while the valve passage 36 is formed in a short nipple 48 that extends into the L-shaped member 49.

It will be noted that the shoulder 32 which supports the valve member 31 also forms a rest for a foot 35 that is associated with an upstanding flow controlling stem **35*a* that moves into and out of the atomizing device upon reciprocation of the atomizer head 15. As shown, a spring 13 encompasses said stem 35*a* thereby urging it away from the reciprocable means 14 having the spaced upper and lower pistons 17 and 18**.

The dilatable valve passages 37 and 38 lead to chambers **37*a* and 38*a*, respectively, within which balls 42 and 43 are positioned. As shown, the balls cooperate with the seats 40 and 41 depending on whether the atomizer is used in the upright position as shown in the drawing or whether it is turned upside down so the fluid then surrounds the tube 46 and is fed to the first pressure chamber past the ball valve 42**.

Having described the first embodiment of this invention it is believed that it will be clear that when the atomizing head 15 is depressed the upper valve 29 and the lower check valve 31 are held closed and the upper pressure chamber 11 and the lower pressure chamber 12 are boosted to an equal pressure level through the bore 19 of the reciprocable member 14 which always provides for communication between the two pressure chambers. Hence, since the upper cylinder 16 and its tubular piston 17 have a greater diameter than that of the lower cylinder 8 and its tubular piston 18, the downward force exerted on the piston 17 is accordingly greater than the upward force on the piston 18. As a result, when the difference in the two opposite forces exceeds the upward biasing force of the coil spring 13 as the depressing stroke proceeds, then the piston 17 and the conical valve member 25 are moved downward away from the atomizer head 15, so that the upper valve 29 is opened. At this instant, the liquid, which has been confined under pressure during these depressing strokes in the pressure chamber defined between the upper valve 29 and the lower check valve 31, is permitted to spurt into the cavity 27 through the opened upper valve 29 and is atomized at the nozzle outlet 26. Thus, the liquid is sprayed during the depressing stroke of the atomizer head 15, and, as a result, the inside pressure of the pressure chamber is decreased to a predetermined level, under which the elastic biasing force of the coil spring 13 overcomes the inside pressure. Then the tubular sliding member 14 moves upward to close the upper valve 29 and the spray of the liquid is terminated.

Further, when the depressing force on the atomizer head 15 is weakened, the summation of forces of the coil spring 13 and the piston 18 exceeds the downward force of the piston 17, then the conical valve member 25 is elevated together with the piston 17 to close the upper valve 29. When the atomizer head 15 is released from manual depression at the next stage, with the upper valve 29 being left closed, the atomizing head 15 and the tubular sliding member 14 are returned or moved upward by the biasing force of the coil spring 13. Since the piston 17 is also elevated at this time, the volume of the pressure chamber is enlarged to change its pressure to a vacuum level. As a result, the lower check valve 31 is opened by the pressure difference between the pressure chamber and the liquid container 1 to allow the liquid in the container 1 to flow into the pressure chamber for the next spray.

Following the aforementioned actions, the present invention has a further additional advantage in respect to the three-way valve Ba. That is to say, when the pressure chamber is evacuated, since the valve assemblies 44, 45 of the three-way valve Ba have fluid communication with the pressure chamber, the ball valve member 43 is lifted from the valve seat 41 to open the valve passage 38, while the other ball valve member 42 remains seated on the valve seat 40 in an airtight manner to close the valve passage 37. Consequently, the liquid in the liquid container 1 is permitted to flow into the pressure chamber 12 from its suction port 30 by way of the suction tube 47, the valve passage 38, the valve passage 36 and the L-shaped tube 41.

In view of the foregoing it will be apparent how the atomizer operates when used in an inverted position.

It will be appreciated from the description hereinbefore that, when the miniature atomizer is used in both normal and inverted positions, although one of two suction tubes 46, 47 protrudes into the air, as shown in FIG. 1, in the liquid container 1, it is prevented from sucking in ambient air, for the valve assembly to which such suction tube is connected has its passage tightly closed. Thus, the suction of the liquid is effectively performed in either position of the miniature atomizer.

Figure 2:
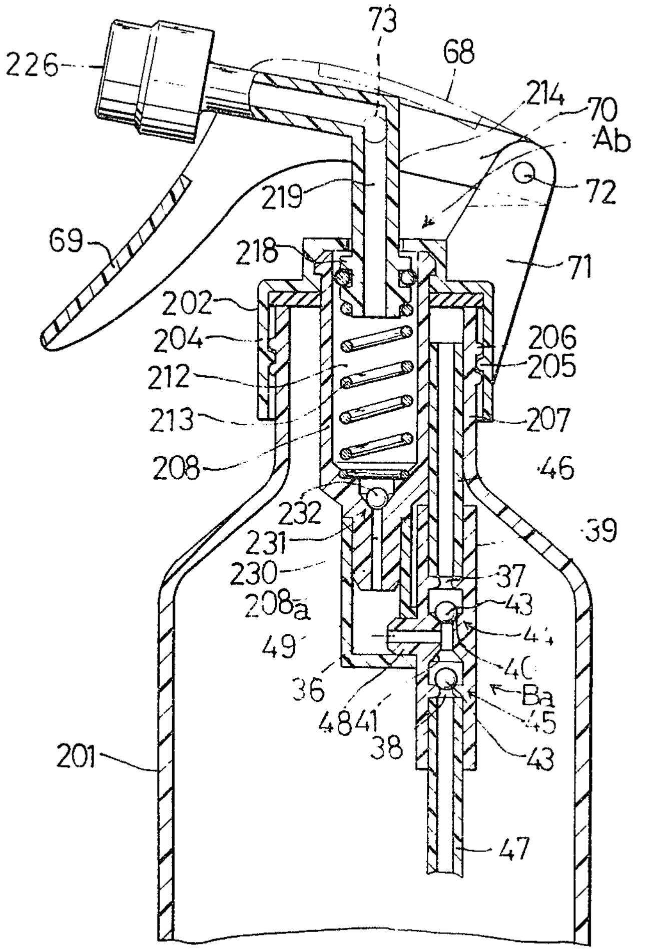
FIG. 2 is a longitudinal cross-section of an invertible atomizer, showing a further example of the use of the structure of the first embodiment of the present invention.

A further embodiment of the present invention will be described with reference to FIG. 2. An atomizing device Ab of an atomizer gun type comprises a cylinder 208 which depends from a cap 202 within a liquid container 201. An L-shaped reciprocable pumping member 214 is received in the cylinder 208 with an spring member 213 interposed between the pumping member 214 and the bottom of the cylinder 208. In this example, the atomizing device Ab is provided with a pressure chamber 212 corresponding to the lower pressure chamber 12 of the first embodiment. An area surrounding the suction port 230 is formed with a valve seat 231 on which a ball valve member 232 is disposed to form a check valve. The reciprocating pumping member 214 is provided with a nozzle extension that is perforated at 226 for atomization of the contents of the receptacle. The lever 71 associated with the cap 202 is pivotally attached to the operating mechanism 69 and the pumping member 214 by means of pivot elements 72 and 73, respectively. Thus, in a non-operational state the device appears as in FIG. 2, and it will be a simple matter to visualize how the pumping action to achieve later atomization is possible by a squeezing movement of the trigger 69.

The above atomizing device Ab is connected, having fluid communication through its suction port 230, to the three-way valve Ba by means of the elbow tube 49. The three-way valve Ba of this example has the same structure as that of the first embodiment. Each suction tube 46, 47 is extended upward and downward within the liquid container 201 to provide a suction passage either in the position shown in the drawing or in an inverted position of the atomizer.

Figure 3:
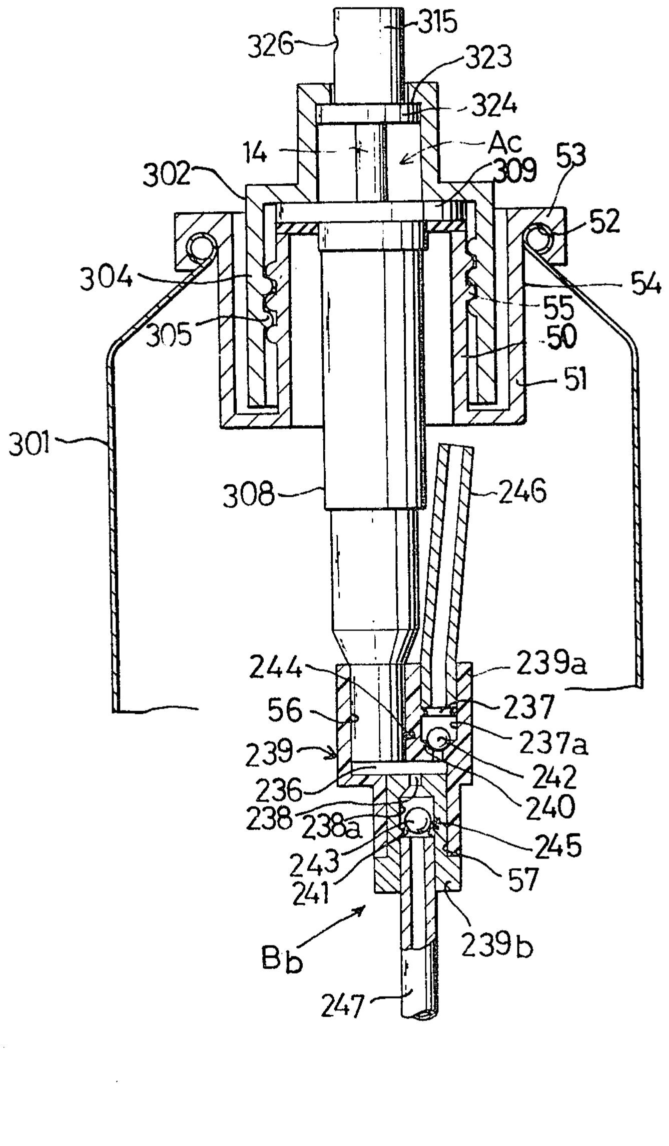
FIG. 3 is a longitudinal, partial cross-section of another invertible miniature atomizer, showing a further embodiment of the present invention.

A further embodiment of the present invention will be described in connection with FIG. 3. The liquid container 301 is made of a metallic material and is provided at the other mouth portion thereof with a chime portion 52. An atomizing nozzle structure together with appurtenances necessary to its operation is adapted to be received in an annular well 51 one wall 54 of which is secured to the chime while the re-entrant wall 50 is provided with exterior threads 55 is thereby arranged to receive the atomizing structure 308 which is supported by an annular flange 309 on the rim of wall 50. An annular perforated cap 302 threaded as at 305 retains the atomizer in the receptacle with the nozzle 315 arranged to extend through the perforation.

In this embodiment of the present invention, all types of well-known atomizing structures may be applicable to the atomizing device Ac, which, for example, comprises a pressure chamber, valves and the atomizing head as its principal elements. The three-way valve Bb in the second embodiment of the present invention includes a valve casing 239 which comprises an integrated open-ended upper part **239*a* and a lower part 239*b*. The upper part 239*a* includes a valve passage 237 and an adjacent aperture 56 for fluid communication with each other through passage 236 with the lower half including an aperture 57 for fluid communication with passage 236. The valve passage 237 is formed in the same manner as in the first embodiment of the present invention and connected to a suction tube 246. The lower part 239*b* of the valve casing 239 is provided with a passage 238 which extends along the vertical axis thereof and formed in the same manner as in the first embodiment and further connected to a suction tube 247. The valve casing 239 is assembled by inserting the lower part 239*b* into the aperture 57 of the upper part 239*a*. The valve casing 239, into the aperture hole 56 of which the lower cylinder 308 is inserted, is arranged to have a unitary structure with the atomizing device Ac. As a result, the third valve passage 236 of the three-way valve Bb provides fluid communication between the bottom end of the lower cylinder 308 and valve passages 237 and 238. The three-way valve Bb described herein as the second embodiment makes it possible to transmit the liquid from the liquid container 301** to the pressure chamber in either a normal or inverted position of the atomizer as described hereinbefore in connection with the first embodiment.

Figure 4:
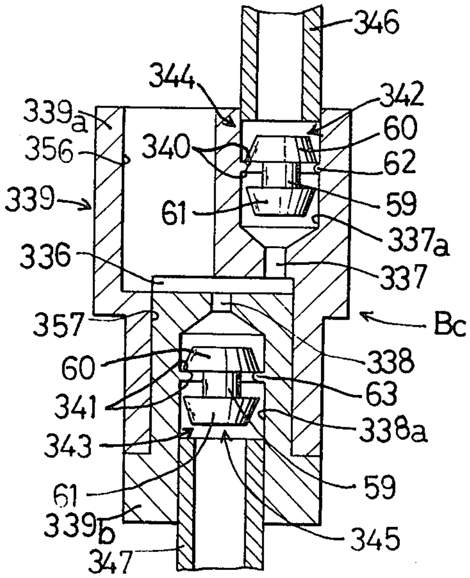
FIGS. 4 and 5 are longitudinal cross-sections of modified three-way valves, showing the third and fourth embodiments of the present invention, respectively.

Turning now to FIG. 4, the third embodiment of the present invention will be described. In this embodiment, a three-way valve Bc includes a valve casing 339 which is formed in a manner very similar to that illustrated in FIG. 3 in that the upper part **339*a* and the lower part 339*b* are provided with valve passages 337, 338 that communicate through passage 336. Valve chambers 337*a* 338*a* are provided with inwardly extending annular flanges 62, 63 respectively thus forming valve seats 340, 341. In this embodiment each of valve members 342, 343 comprise two bi-directional valve heads 60, 61 which are connected to each other by the use of the connecting rod 59. The valve members 342, 343 are so disposed that the inwardly extending flanges 62, 63 are positioned between the two respective valve heads 60, 61 to permit vertical movement of the valve members 342, 343 therebetween. Valve assembly 345 of the third embodiment of invention is thus formed. Suction tube 347 corresponds to the case of FIG. 1 and fitting hole 356 corresponds to the case of FIG. 3**.

Figure 5:
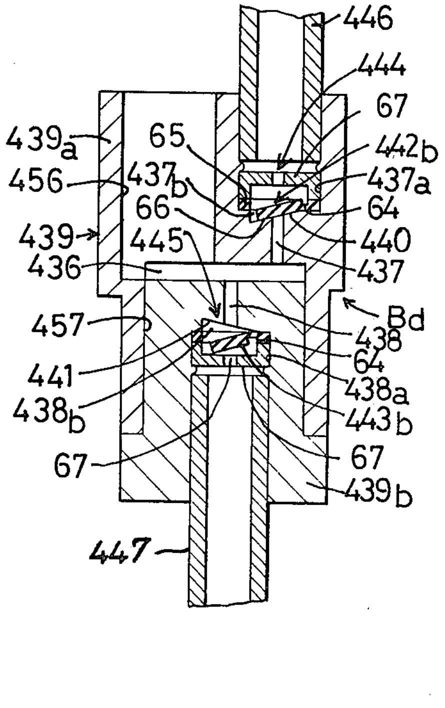

The fourth embodiment of the present invention is shown in FIG. 5. In this embodiment, the three-way valve Bd is substantially identical to those shown in the second and third embodiments. Valve assemblies 444, 445 arranged on two valve passages 437, 438 are so formed as described below. Valve members **442*b*, 443*b* in this embodiment are elastic disks made of rubber or soft synthetic resinous material. The elastic disks are severed along part of their extent so as to leave a hinging element as shown at 65. The valve members 442*b*, 443*b* are retained in valve chambers 437*a* and 438*a* by perforated holders 67 which are press-fitted within the said valve chambers. The valve seats 440, 441 are canted to form seating surfaces for either of the flap valves irrespective of the manner in which the receptacle is held all of which will be clear from the earlier description. In operation, since the two valve passages 437, 438 are arranged symmetrically about the horizontal axis of a valve passage 436, either one of the two valve passages which is located at a lower position depending on the position of the miniature atomizer is opened to transmit the liquid, while the other valve passage located at an upper position is maintained closed. Valve casing 439, its upper part 439*a* and lower part 439*b* corespond to the embodiment of FIG. 4. Suction tube 446 and 447, fitting the hole 456 and aperture 457 correspond to the embodiment of FIG. 3**.

Figure 6:
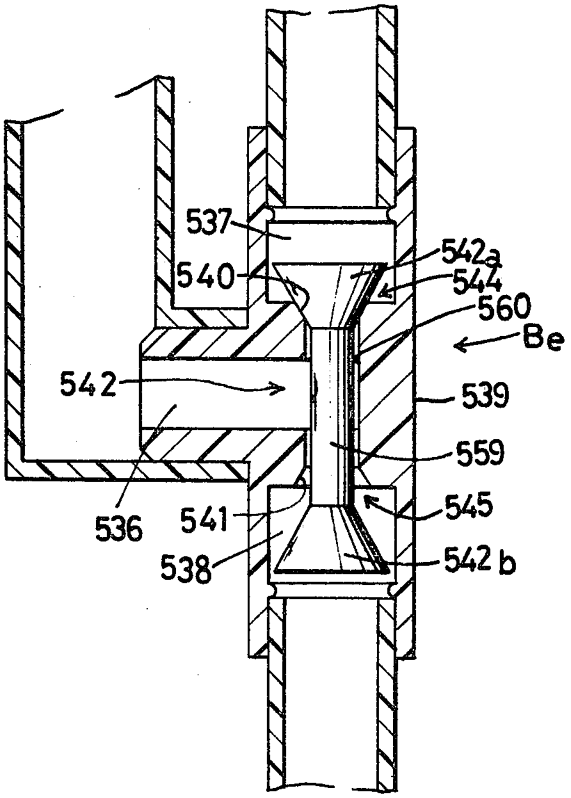
FIG. 6 is a longitudinal cross-section of a three-way valve including one integrated valve member.

Finally turning to FIG. 6, the fifth embodiment of this invention will now be described. A three-way valve Be is provided with a valve casing 539 made of synthetic resinous material to provide a unitary structure. The valve casing 539 includes three valve passages 536, 537 and 538 having respective directions in communication with each other. The valve passages 537, 538 are disposed upward and downward symmetrically about a horizontal axis of the valve passage 536. The valve passages 537, 538 include valve seats 540, 541. Each valve seats 540, 541 supports corresponding valve head **542*a* or 542*b* of a valve member 542 forming a respective valve assembly 544, 545. The valve member 542 has two conical valve heads 542*a*, 542*b* with converging surfaces thereof extending toward a connecting means 559. Naturally, there are various ways of making these valve assemblies not the least of hich is by injection molding or making the valve member 542 with one separable valve element. The connecting rod 559 moves freely vertically along a bore 560 of the valve passages 537, 538 so that the two valve seats 540, 541 accommodate the movement of the valve member 542, in cooperation with the corresponding valve heads 542***a* and 542*b*. Hence, the valve assemblies 544, 545, formed midway of the two valve passages 537, 538 of the three-way valve Be, have such function that either one of the valve heads 542*a*, 542*b* closes the one valve passage by gravity by gravity while the other valve head opens the other valve passage all of which is clear from the drawings.

What is claimed is:

1. A liquid spraying device comprising a container for liquid, including an axially perforated cap, spray means including a nozzle associated with said container and including reciprocable means extending through said cap, first pressure chamber means depending beneath said cap, said last named means including spaced upper and lower vent means, second pressure chamber means in axial alignment with said first pressure chamber means and positioned above said cap, said reciprocable means including plural piston members having spaced upper and lower skirt means, the spaced upper and lower skirt means of the lower piston member are adapted to open and close said vent means and further including first valve means, said valve means being arranged to control liquid flow from said second pressure chamber means to the nozzle of said spray means, spring means arranged to maintain said first valve means in a closed condition to prevent inadvertent emission of liquid therefrom, second valve means in said first pressure chamber means provided with a seat having a perforation and having an opening in non-aligned orientation with said perforation so as to permit passage of liquid from said container to said first pressure chamber means upon the application of said reciprocable means, liquid carrying means depending from said last-named means and extending into said container, further characterized by suction means including a three-way valve assembly being associated with the said first pressure chamber means.

2. A liquid spraying device as claimed in claim 1, in which said three-way valve assembly includes a single valve stem and oppositely disposed head portions arranged to cooperate with valve seats complemental with said head portions.

3. A liquid spraying device as claimed in claim 1, in which said three-way valve assembly includes at least a pair of elastic flap valve members.

4. A liquid spraying device as claimed in claim 3, in which said flap valve members cooperate with canted valve seat means.

5. A liquid spraying device as claimed in claim 1, in which said three-way valve assembly includes a pair of bi-directional reciprocal valving means which cooperate with integrated oppositely disposed valve seats.

6. A liquid spraying device as claimed in claim 1, in which said three-way valve assembly includes at least a pair of axially aligned ball valve members which are arranged to cooperate with integrated oppositely disposed valve seats.

7. A liquid spraying device as claimed in claim 1, in which said three-way valve assembly further include oppositely extending tubular elements capable of directing liquid flow thereto when the receptacle is either in an upright position or an inverted position.

8. A liquid spraying device as claimed in claim 1 in which said three-way valve assembly includes a valve casing connected to the lower portion of said reciprocable means, said valve casing including a pair of axially aligned ball valve means arranged to cooperate with integrated oppositely disposed valve parts.

* * * * *